(12) United States Patent
Moriguchi

(10) Patent No.: US 6,358,042 B1
(45) Date of Patent: Mar. 19, 2002

(54) HEATING FURNACE

(75) Inventor: Yaichiro Moriguchi, Sakai (JP)

(73) Assignee: Kei Moriguchi (JP)

( * ) Notice: Subject to any disclaimer, the term of this patent is extended or adjusted under 35 U.S.C. 154(b) by 0 days.

(21) Appl. No.: 09/691,729

(22) Filed: Oct. 18, 2000

(30) Foreign Application Priority Data

Oct. 19, 1999 (JP) .......................................... 11-296944

(51) Int. Cl.⁷ ................................................. F24J 3/00
(52) U.S. Cl. .......................... 432/227; 432/95; 34/166; 34/171; 34/173
(58) Field of Search ............................ 432/94, 95, 102, 432/221, 227; 34/166, 167, 168, 171, 173, 203

(56) References Cited

U.S. PATENT DOCUMENTS

| | | | |
|---|---|---|---|
| 3,768,552 A | * 10/1973 | Ciraud | 432/221 |
| 4,013,401 A | * 3/1977 | Georgiev et al. | 432/95 |
| 4,318,691 A | * 3/1982 | Strong | 432/102 |
| 4,528,012 A | * 7/1985 | Sturgill | 432/180 |
| 5,738,511 A | * 4/1998 | Borah et al. | 432/95 |

* cited by examiner

*Primary Examiner*—Gregory Wilson
(74) *Attorney, Agent, or Firm*—Galgano & Burke

(57) ABSTRACT

A heating furnace is provided to use for medium and small size incinerator, to control air pollution effectively using waste heat generated from the incinerator and not to require large size equipment. The heating furnace includes a first opening for inserting disposal material, a second opening communicating with a furnace body being capable of heating the disposal material, a heat flow passage formed between the first opening and the second opening, and a heating tube having receiving means, the receiving means receiving the disposal material into the heat flow passage and at the same time dropping the disposal material into the furnace body during the rotation. A motor is connected to the furnace body to obtain electric power by heat generated from the furnace body.

13 Claims, 4 Drawing Sheets

HEATING FURNACE

BACKGROUND OF THE INVENTION

1. Field of the Invention

The present invention relates to a heating furnace, and more particularly, to a heating furnace, which is capable of connecting to a motor using heat generated by combustion.

2. Description of the Related Art

When a heating furnace is used, waste heat after the combustion is generally emitted in the air, and the emission of exhaust gas containing [$Co_2$] $CO_2$ is the cause of the warmth-oriented phenomenon and the air pollution.

Here, a large size furnace transfers the waste heat, generated by the incineration, to a boiler or the likes to use it for heating water, to drive a power generator while generating steam and to use for heating a room or for hot-water supply. Alternatively, the large size furnace adopts a cogeneration method. However, medium and small size furnaces have been controlled or stopped in use for incineration, because of the understanding of that waste heat is emitted with exhaust gas and it is the cause of the warmth-oriented phenomenon and the air pollution such as the emission of dioxin.

However, if the large size furnace incinerates all wastes, it is not effective and causes inconvenience in daily disposal activity. Furthermore, the medium and small size furnaces require a heating equipment being capable of controlling bad influences of exhaust gas due to atmospheric discharge of noxious substances.

SUMMARY OF THE INVENTION

It is, therefore, an object of the present invention to provide a heating furnace, which can be used as medium and small size incinerators, is capable of controlling air pollution by using waste heat effectively and does not require large size equipment.

To achieve the above object, the present invention provides a heating furnace comprises: a first opening for inserting disposal material; a second opening communicating with a furnace body being capable of heating the disposal material; a heat flow passage formed between the first opening and the second opening; and a heating tube having receiving means, the receiving means receiving the disposal material into the heat flow passage and at the same time dropping the disposal material into the furnace body during the rotation, wherein a motor is connected to the furnace body to obtain electric power by heat generated from the furnace body.

According to the above construction, the plural receiving means in the heating tube makes the disposal material stay in the heating tube for a long time, and thereby the disposal material is heated, dried or carbonated. Therefore, a large quantity of disposal material such as garbage containing lots of water can be treated effectively in a high speed and in a high temperature by heating and electric power can be obtained from waste heat generated from the heating furnace. The electric power, by using a power generator, is provided to a heating element treating exhaust gas by heating and the decomposition of noxious ingredients of exhaust gas is accelerated effectively. The noxious ingredients can be mollified in virulence or become harmless. As the motor, for example, an external combustion engine being capable of converting the reciprocating motion of a piston into the rotary motion or capable of bleeding the reciprocating motion by receiving waste heat can be used.

As the result, the heating furnace can be used for not only a large size incinerator but also a medium and small size incinerators, control the air pollution effectively using waste heat generated from the heating furnace and provide the heating furnace not requiring large size equipment.

It is preferable that a second heating furnace is connected to the downstream part of the heating tube and additional motor is provided to the downstream part of the second heating furnace to obtain electric power by heat generated from the second heating furnace.

According to the above, through the second heating furnace, exhaust gas can be mollified in virulence or become harmless, use waste heat generated from the second heating furnace as power source, and treat the disposal material more effectively.

Furthermore, in another aspect of the present invention, the heating furnace comprises: a first opening for inserting disposal material; a second opening communicating with a furnace body being capable of heating the disposal material; a heat flow passage formed between the first opening and the second opening; and a heating tube having receiving means, the receiving means receiving the disposal material into the heat flow passage and at the same time dropping the disposal material into the furnace body during the rotation, wherein a second heating furnace is connected to the downstream part of the heating tube and a motor provided to the downstream part of the second heating furnace to obtain electric power by heat generated from the second heating furnace.

According to the above construction, by the operation of the motor mounted at the downstream part of the second heating furnace, the electric power can be provided to the heating element treating exhaust gas, and thereby the decomposition treatment of the noxious ingredients of exhaust gas is facilitated and the noxious ingredients of exhaust gas can be mollified in virulence or become harmless.

As the result, the heating furnace according to the present invention can be used for not only a large size incinerator but also medium and small size incinerators, control the air pollution by effectively using waste heat generated from the incinerator, and provide a heating furnace not requiring a large size equipment.

It is preferable that the second heating furnace is heated by current source, the motor serves as a power generator, and the electric power obtained from the power generator is used for current source of the second heating furnace.

According to the above construction, as oil is not used when exhaust gas generated from the body or the heating tube is decomposed by heating, there is no noxious gas from the fuel, the power expenses for the second heating furnace can be considerably reduced and the running cost of the heating furnace can be reduced.

It is preferable that the plural receiving means are arranged inside a housing of the heating tube in zigzag in the vertical direction.

According to the above construction, as the plural receiving means are arranged in the housing vertically in a zigzag form, a wider space between the inner wall surface of the housing and the receiving means can be secured. Therefore, the heat inflow path can be secured sufficiently and the disposal material such as garbage containing lots of water can be effectively treated in large quantities and in a rapid speed.

When the heating element of the second heating furnace is charged with electricity, exhaust gas inserted flown into the heating furnace is heated to the temperature over 1300 degrees.

According to the above construction, as oil is not used when exhaust gas generated from the body or the heating tube is decomposed by heating, there is no noxious gas from the fuel, and as the inside of the heating furnace is heated to the temperature over 1300 degrees, not only noxious gas such as ["Nox,Sox"] $NO_x, SO_x$, HCl, HCN and others but also dioxin can be decomposed surely to be harmless, so that gas generated from the heating furnace can be cleaned. Moreover, it is preferable that the furnace is heated to the temperature over 1,350 degrees by the heating element. Therefore, the noxious gas can be decomposed rapidly, the treatment speed can be improved and innoxiousness of gas can be facilitated.

To achieve the above object, in a further aspect, the heating furnace comprises: a furnace body being capable of heating disposal material; a first opening for inserting disposal material into the furnace body; a second opening communicating with the furnace body; and a second heating furnace disposed at the downstream part of the second opening, the second heating furnace being capable of decomposing noxious substance of exhaust gas by heating, wherein a motor is connected at one or both sides of the furnace body or the second heating furnace to obtain electric power by heat generated from one or both sides of the furnace body or the second heating furnace.

According to the above construction, the heating furnace can be used as medium and small size incinerators and electric power can be obtained by waste heat generated from one or both sides of the body or the second heating furnace. The electric power, by using in the power generator, can be provided to the heating element treating exhaust gas by heating, and thereby the noxious ingredients of exhaust gas can be decomposed effectively and rapidly and mollified in virulence or become harmless. Furthermore, the electric power can be effectively used as various power sources to reduce the running cost of the heating furnace.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
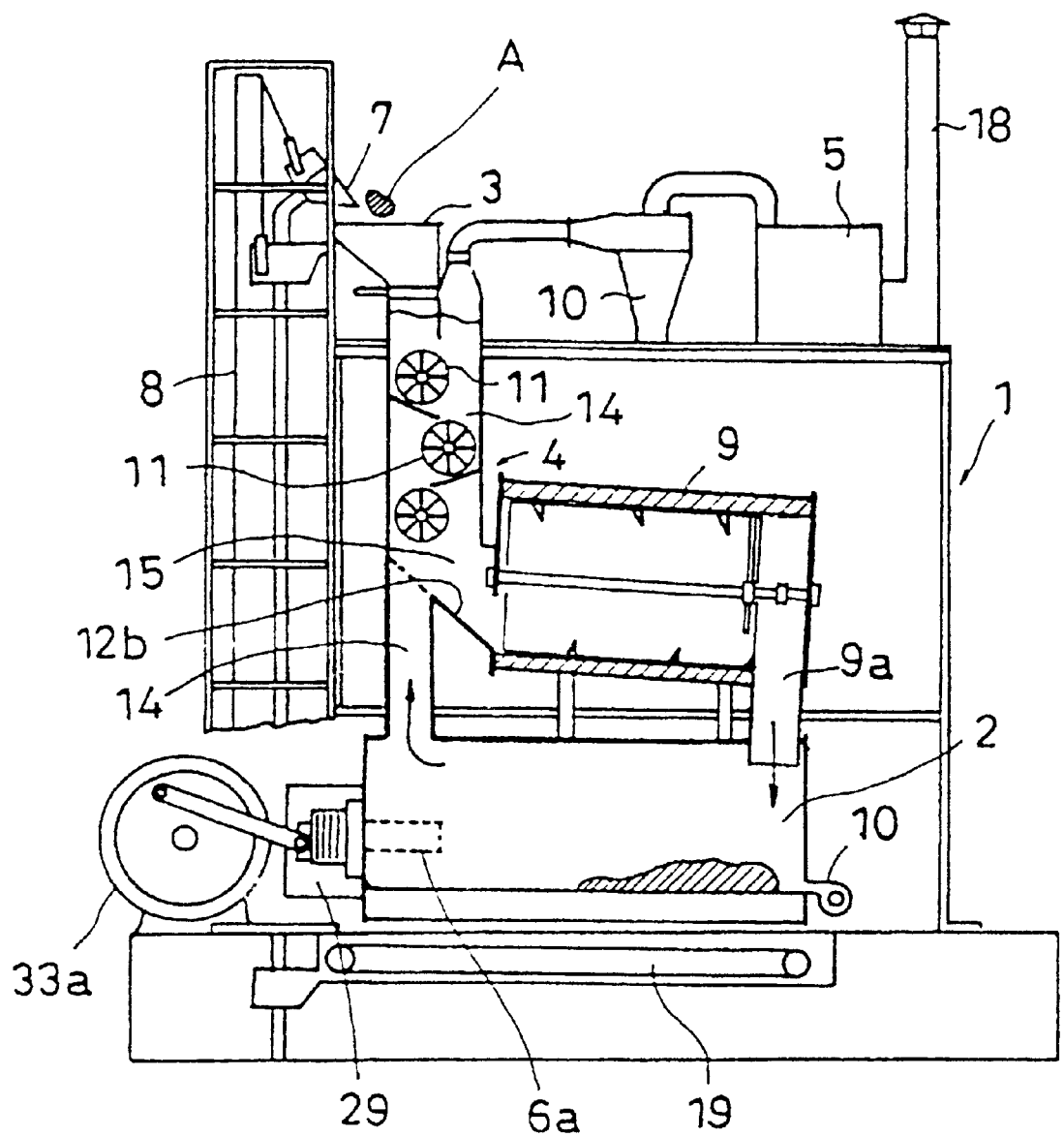
FIG. 1 is a sectional view of a heating furnace according to the present invention.

The present invention will now be described in detail in connection with preferred embodiments with reference to the accompanying drawings. For reference, like reference characters designate corresponding parts throughout several views.

FIG. 1 is a schematic view of a heating furnace 1 according to a preferred embodiment of the present invention. The heating furnace 1, in the upper part, includes a first opening of a hopper form for inserting disposal material A, a heating tube 4 for heating, drying or carbonating the inserted disposal material A, a rotary kiln 9 for staying the disposal material A in the downstream part of a heated exhaust gas outflow path of the heating tube 4 and transferring it downward, a cyclone 13, which is a refuse removal device, and a second heating furnace 5 connected to the cyclone 13. The heating furnace 1, in the lower part, includes a furnace body 2 (a first furnace) for heating and burning the disposal material A and a motor 6 for bleeding rotary force by heat generated from the furnace body 2.

An elevator device 8 performs the insertion of the disposal material into the first opening 3 to lift the disposal material from a lower portion to the first opening with a bucket 7. The insertion method is not restricted to the above, and it will be appreciated that a method of continuously carrying the disposal material from the lower portion to the first opening 3 using a belt conveyer may be adopted.

Figure 2:
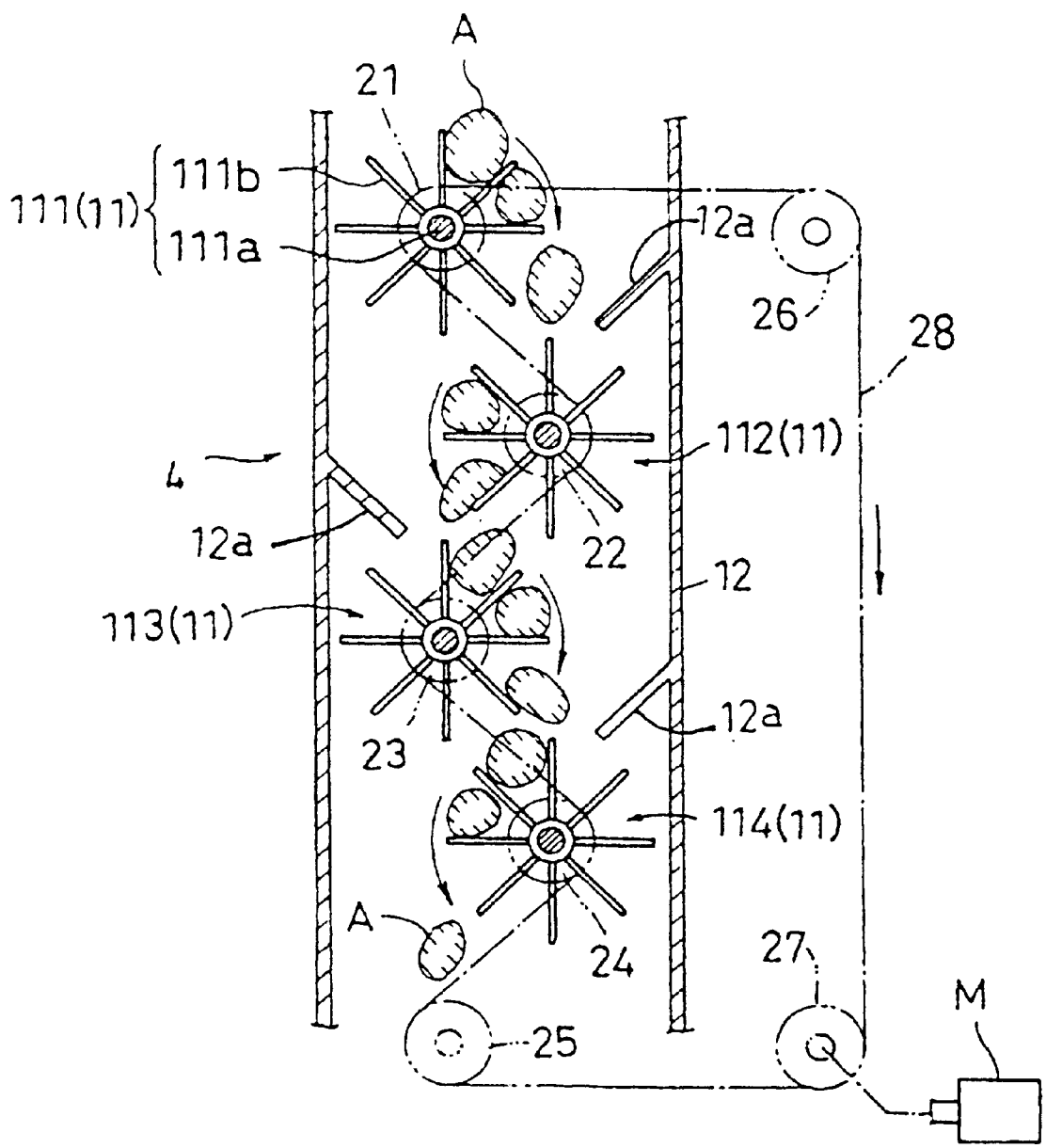
FIG. 2 is a partially enlarged view of a heating tube of the heating furnace of FIG. 1.

As shown in FIG. 2, the heating tube 4 includes a housing 12 of an angular shape or a cylindrical shape to receive the disposal material A inside and a plurality of receiving means 11 staying the disposal material A in the heating tube and dropping the disposal material A into the furnace body 2 while rotating (The receiving means 11 are shown four in FIG. 2 and three in FIG. 1 to avoid complexity). The receiving means 11 are rotated reversibly to each other and arranged vertically in prescribed intervals from each other to form a space to drop the disposal material A. The space serves as a heat flow passage 14 ascending from the lower portion of the furnace body 2, and the disposal material A is heated and dried while dropped. If dropped into the body 2, the disposal material A is heated, and thereby being in a burnt or carbonated state. Therefore, there is little fuel required for heating in the body 2, and when the disposal material A is burnt, the heating reaction does not consume the material.

The receiving means 11 of the heating tube 4 will be described in more detail. The receiving means 11 are disposed at the upper end of one direction of the housing 12 and located directly below the first opening 3, which receives the disposal material A. Each of the receiving means 11 includes a first receiving means 111 leaning against an outer wall of the housing extending the outer end of the first opening 3, a second receiving means 112 located below the first receiving means 111 and mounted adjacent to the other side outer wall of the housing 12, a third receiving means 113 disposed under the heat flow passage 14 located directly below the first receiving means 111, and a fourth receiving means 114 disposed under the heat flow passage 14 located directly below the second receiving means 112. It will be appreciated that the number of the receiving means 11 is not restricted to the above and varied depending on the disposal capability.

The first to fourth receiving means 111 to 114 are arranged vertically inside the housing 12 of the heat flow passage 14 in a different way, and thereby the heat flow passage 14 securing the space sufficiently is in the form of a meander.

Guides 12a for guiding the disposal material A are disposed between the first receiving means 111 and the second receiving means 112, between the second receiving means 112 and the third receiving means 113 and between the third receiving means 113 and the fourth receiving means 114 respectively.

A slant guiding plate 12b is formed directly below of the fourth receiving means 114 inside the housing; the left side of the slant guiding plate 12b serving as the heat flow passage 14 and the right side serving as a second opening 15 for discharging the disposal material A dropped from the fourth receiving means 114.

The first receiving means 111 includes a central rotary shaft 111a and eight plates 111b extending from the central rotary shaft 111a in a radial manner and the other receiving means 112, 113 and 114 have the same structure as the first receiving means 111. The disposal material A is received between the plates 111b. A chain 28 is driven in the clockwise direction of FIG. 2 coaxially with the central rotary shaft of each receiving means, wrapping each receiving means 11, slave sprockets 25 and 26 and a driving sprocket 27. Thereby, the first and third receiving means 111 and 113 rotate in the clockwise direction and the second and fourth receiving means 112 and 114 rotate in the counterclockwise direction.

The disposal material A dropped after passing the heating tube 4 is transferred through the slant guiding plate 12b into the rotary kiln 9, which is slanted toward an outlet 9a. The rotary kiln 9 stays the disposal material A and transfers it to the body 2 while rotating slowly by a driving device (not shown). It will be appreciated that, as the means for transferring the dropped disposal material A to the body 2, a screw conveyer or a heat-resistant belt conveyer may be used besides the rotary kiln.

A gas burner 10 is mounted at one end of the body 2 to burn the transferred disposal material A. The disposal material A is dried or carbonated by imperfect combustion while transferred into the rotary kiln 9, and its combustion period of time in the body 2 is short and an amount of fuel combustion is small. Therefore, the disposal material A, for example, garbage having much moisture content, excrement, medical wastes such as diapers, burlap bags and others, can be treated more effectively, compared with the conventional methods.

Charcoal powder produced by the incineration in the furnace body 2 is automatically or manually discharged to the outside of the heating furnace by an incinerated charcoal recovering device 19. The waste heat generated from the furnace body 2 is effectively used as power source by the motor 6, which will be described as follows.

Figure 3:
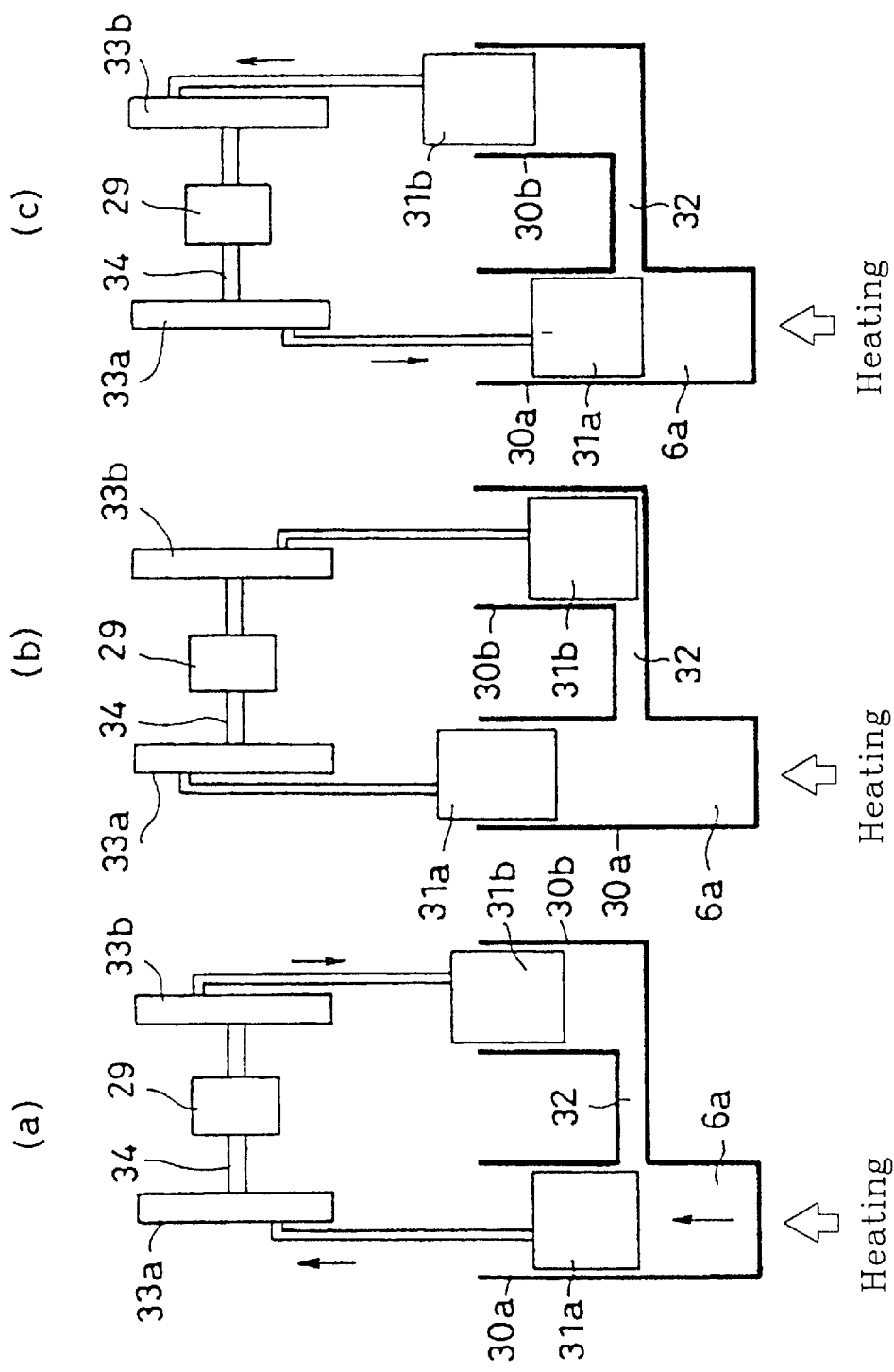
FIG. 3 is a schematic view showing the operation of a first motor used in the heating furnace of FIG. 1.

Referring to FIG. 3, the motor 6 will be described hereinafter. The motor 6 constitutes so-called an external combustion engine. The motor 6 includes first and second cylinders 30a and 30b connected to each other by a connection path 32 interposed therebetween, first and second pistons 31a and 31b inserted in the cylinders 30a and 30b respectively, first and second flywheels 33a and 33b connected to the upper end of the pistons 31a and 31b respectively, and a power generator 29 producing electric power by the flywheels 33a and 33b. An air chamber 6a communicating with the first cylinder 30a is inserted into one end of the body 2 at a prescribed interval. As the first and second flywheels 33a and 33b share a rotary shaft 34, the rotary motion of the flywheels 33a and 33b can be transferred to the power generator 29. The first cylinder 30a receives heat generated from the furnace body 2 and drives the first piston 31a in reciprocating motion, and at the same time, drives the second piston 31b in the second cylinder 30b. Through the phase difference of the first and second pistons 31a and 31b, the rotary shaft 34 is rotated and the rotary motion is transferred to the power generator 29.

The rotary motion of the rotary shaft 34 will be described in more detail. First, air inside the first cylinder 30a expands by heat generated from the body 2, and when the first piston 31a moves forward, the connection path 32 is opened and the second piston 31b starts to move backward (See FIG. 3a). In a top dead point where the first piston 31a can extend the most, the second piston 31b is retreated the most (See FIG. 3b). If the air chamber 6a is heated continuously, the heated air is provided into the second cylinder and the second piston 31b is moved forward. In a top dead point wherein the second piston 31b can extend the most, the first piston 31a is retreated the most (See FIG. 3c). At this time, depending on the back and forth motion of the first and second pistons 31a and 31b, the first and second flywheels 33a and 33b connected to the upper ends of the first and second pistons 31a and 31b respectively start to rotate, and at the same time, the rotary shaft 34 is rotated. The motion is repeated to rotate the rotary shaft 34 continuously. The rotary motion of the rotary shaft 34 is transferred to the outside and various external engines such as the power generator 29 can be driven. The electric power generated by the power generator 29 is provided to a heating element of the second heating furnace 5 using the electric power generated by the power generator 29 as power source. Furthermore, an air vent plate may be mounted at prescribed places of the cylinders. Fluid inserted in the cylinder 30 may be, for example, hydrogen, helium or others. The rotary shaft 34 is in the form of a bar as shown in the drawings, but it may be a crankshaft.

Figure 4:
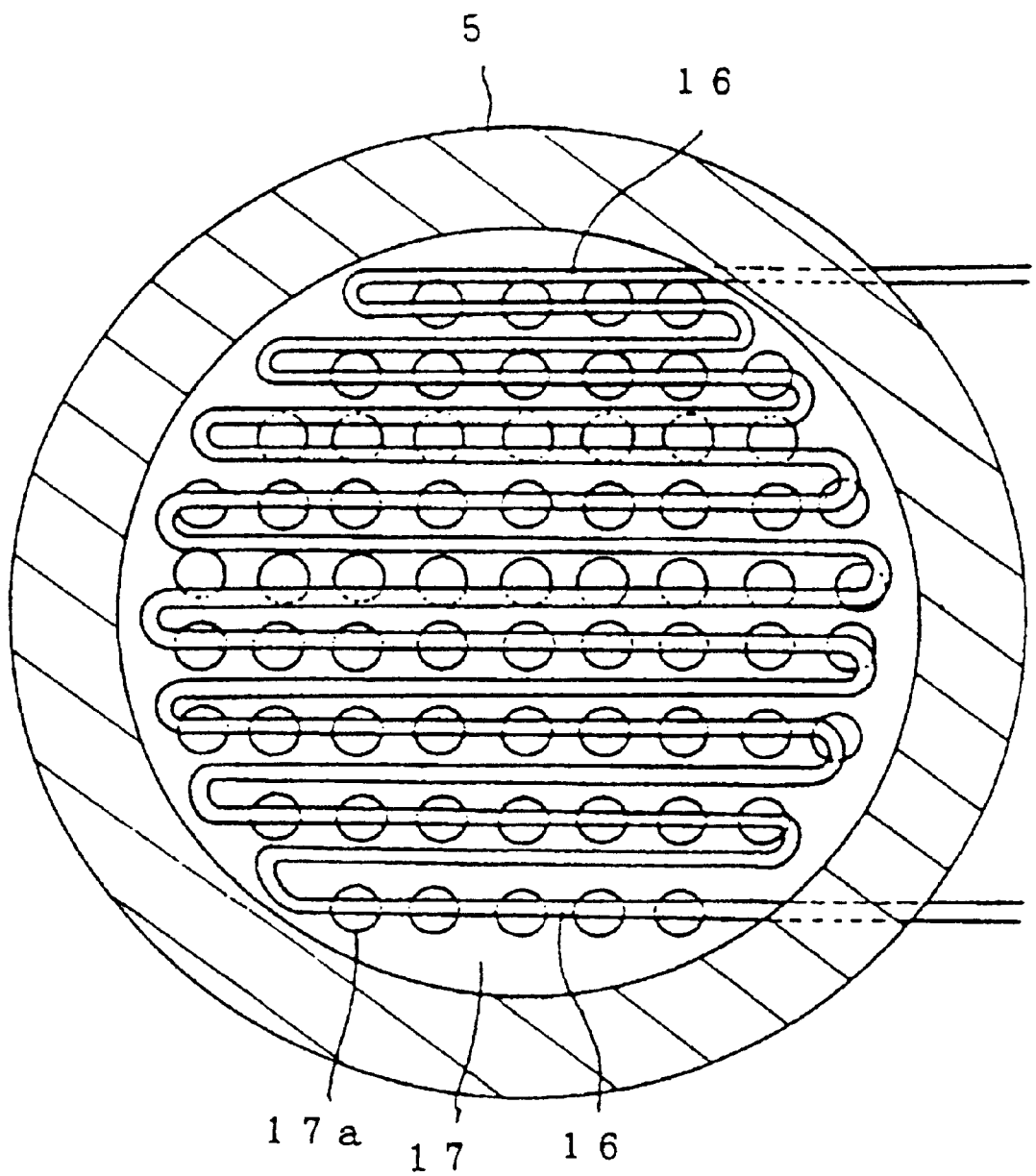
FIG. 4 is a sectional view of a second heating furnace used for the heating furnace of FIG. 1.

Next, referring to FIG. 4, the second heating furnace 5 will be described hereinafter. FIG. 4 is a longitudinally sectional view of the second heating furnace 5. In the second heating furnace 5, exhaust gas moves vertically in respect to the ground. The second heating furnace 5 uses, as the heating element, a Kantaru high temperature heating element (Trademark), which is an alloy of Fe—Cr—Al group in the form of a bar or in the form of a line, and for a Kantaru Sba heating element (Trademark) using $MoSi_2$ as the main ingredient. In this case, as shown in FIG. 4, a multistage heating element 16 being in the form of a shank is arranged horizontally to cross the inside of the heating furnace and a supporting member 17, which has a plurality of through holes 17a like a punch metal, is arranged at the lower portion of the heating element 16. Thereby, when the inside of the heating furnace is in a high temperature, the heating element 16 can be prevented from the transformation and the inside of the heating furnace can be heated uniformly. Furthermore, as shown in FIG. 4, the heating element 16 is arranged inside the second heating furnace 5 in an overlay medium, so that exhaust gas is contacted to the heating element 16 while passing inside the heating furnace, and is decomposed by heating.

The supporting member 17 may be ceramic material or refractory metal. Additionally, the supporting member 17 may be in the form of a reticular structure, in which a number of lines are entangled densely, besides the platy structure. The essential points are to have a prescribed permeability and to protect and support a prescribed strength. In spite of the above structure, the inside of the heating furnace reaches the temperature over 1300 degrees Celsius and the exhaust gas is surely decomposed by heating and becomes harmless. It is convenient that the electric power supplied to the heating element 16 is supplied in interlock with the temperature control according to the measuring result of the inside temperature of the heating furnace measured by the heat conduction. The exhaust gas, which becomes harmless by the second heating furnace 5, is discharged from a gas tube 18.

Moreover, the heating furnace may have the construction that the heating furnace has a transverse type, a plurality of Kantaru heating elements are hung down from a ceiling part of the heating furnace and exhaust gas passes between them. In that case, the supporting member 17 may not be positively necessary.

Modified Embodiments (1) In the above embodiment, the motor and the heating furnace are integrated, but it is also possible that they are separated in a prescribed interval. Moreover, it will be appreciated that waste heat generated from the plural furnaces is gathered by piping and drives one motor, but to the contrary, waste heat generated from one furnace drives a number of motors.

(2) In the above embodiment, the motor is installed adjacent to the body (the first furnace), but it is also possible that additional motor is disposed adjacent to the second heating furnace and driven by the waste heat of the second heating furnace. Furthermore, the driving power also can be obtained by mounting the motor adjacent to the furnace body and the second heating furnace and using the waste heat generated from the body and the second heating furnace.

(3) In the above embodiment, the second heating furnace 5 uses a heat alloy of Fe—Cr—Al group as the heating element, but the heating element is not restricted to the above. It will be appreciated that other heating elements, for example, a heat resisting heating element such as tungsten in the form of a line or in the form of a sheet may be used. Alternatively, it is also possible to use a gas burner using gas without the electric heating manner.

(4) In the above embodiment, the disposal material passes through the heating tube and is dropped into the furnace body, but the heating tube is not positively necessary. It is also possible that the inlet of the disposal material is directly formed inside the furnace body according to the property of the disposal material.

While the present invention has been described with reference to the particular embodiments, it is not to be restricted by the embodiments but only by the appended claims. It is to be appreciated that those skilled in the art can change or modify the embodiments without departing from the scope and spirit of the present invention.

What is claimed is:

1. A heating furnace for heating disposal material comprising:
    a furnace body capable of heating disposal material;
    means for directing a stream of exhaust gas from said furnace body into a heat flow passage;
    a heat flow passage comprising a first opening for receiving disposal material and a second opening communicating with said furnace body;
    means for directing a flow of disposal material through said heat flow passage in a direction opposite to the flow of the furnace exhaust gas passing through said heat flow passage, said heat flow passage comprising a plurality of rotatable devices, wherein a first rotatable device rotates in a first direction and a second rotatable device rotates in a second direction which is different from said first direction; and
    means for generating electric power with exhaust gases from said furnace body.

2. A heating furnace according to claim 1 wherein said rotatable devices are operatively connected.

3. A heating furnace according to claim 1 wherein at least one of said rotatable devices comprises a rotatable shaft and a plurality of members extending substantially radially from said shaft.

4. A heating furnace according to claim 3 wherein said members comprise plates.

5. The heating furnace according to claim 1 comprising a second heating furnace for thermal decomposition of exhaust gas connected to the downstream end of the heat flow passage and an additional means for generating power with heat from the second furnace.

6. The heating furnace according to claim 5, wherein the electrical heating source in the second heating furnace is electrically connected to at least one of the electrical power generating means and wherein exhaust gas introduced into the second heating furnace is heated to a temperature over 1300 degrees Celsius.

7. The heating furnace according to claim 1 wherein the second heating furnace is heated with an electrical source, and the electric power generated from said electric power generating means is used for powering the electrical heating source in the second heating furnace.

8. The heating furnace according to claim 1, wherein said rotatable devices are arranged inside a housing in zigzag in the vertical direction.

9. A heating furnace for heating disposal material comprising:
    a furnace body capable of heating disposal material;
    means for directing a stream of exhaust gas from said furnace body into a heat flow passage;
    a heat flow passage comprising a first opening for receiving disposal material and a second opening communicating with said furnace body;
    means for directing a flow of disposal material through said heat flow passage in a direction opposite to the flow of the furnace exhaust gas passing through said heat flow passage, said heat flow passage comprising a plurality of rotatable devices, wherein a first rotatable device rotates in a first direction and a second rotatable device rotates in a second direction which is different from said first direction;
    a second heating furnace for thermal decomposition of exhaust gas in fluidic communication with exhaust gas exiting said heat flow passage; and
    a means for generating electric power with heat from said second heating furnace.

10. The heating furnace according to claim 9 wherein the second heating furnace is heated with an electrical source, and the electric power generated from said electric power generating means is used for powering the electrical heating source in the second heating furnace.

11. The heating furnace according to claim 9 wherein said rotatable devices are arranged inside a housing in zigzag in the vertical direction.

12. The heating furnace according to claim 9, wherein the electrical heating source in the second heating furnace is electrically connected to the electrical power generating means and wherein exhaust gas introduced into the second heating furnace is heated to a temperature over 1300 degrees Celsius.

13. A heating furnace for heating disposal material comprising:
    a furnace body capable of heating disposal material;
    means for directing a stream of exhaust gas from said furnace body into a heat flow passage;
    a heat flow passage comprising a first opening for receiving disposal material and a second opening communicating with said furnace body;
    means for directing a flow of disposal material through said heat flow passage in a direction opposite to the flow of furnace exhaust gas passing through said heat flow passage, said heat flow passage comprising a plurality of rotatable devices, wherein a first rotatable device rotates in a first direction and a second rotatable device rotates in a second direction which is different from said first direction;
    means for generating electric power with exhaust gases from said furnace body;
    a second heating furnace for thermal decomposition of exhaust gas in fluidic communication with exhaust gas exiting said heat flow passage; and
    a second means for generating electric power with heat from said second heating furnace;
    means for generating electric power from the exhaust gas of at least one of said furnace body and said second heating furnace, wherein said electric power is used for said second heating furnace.

* * * * *